US009369197B2

(12) United States Patent
Knefelkamp et al.

(10) Patent No.: US 9,369,197 B2
(45) Date of Patent: Jun. 14, 2016

(54) APPARATUS AND A METHOD FOR DETECTING A COMMUNICATION CHANNEL

(75) Inventors: Sven Knefelkamp, Wedel (DE); Eric Duraz, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 763 days.

(21) Appl. No.: 12/443,762

(22) PCT Filed: Jun. 18, 2008

(86) PCT No.: PCT/EP2008/057706
§ 371 (c)(1),
(2), (4) Date: Dec. 18, 2009

(87) PCT Pub. No.: WO2009/000726
PCT Pub. Date: Dec. 31, 2008

(65) Prior Publication Data
US 2010/0272012 A1    Oct. 28, 2010

Related U.S. Application Data

(60) Provisional application No. 60/937,377, filed on Jun. 27, 2007.

(30) Foreign Application Priority Data

Jun. 27, 2007  (DE) .......................... 10 2007 029 671

(51) Int. Cl.
*H04W 40/00* (2009.01)
*H04B 7/185* (2006.01)

(52) U.S. Cl.
CPC ................... *H04B 7/18508* (2013.01)

(58) Field of Classification Search
None
See application file for complete search history.

(56) References Cited

U.S. PATENT DOCUMENTS 6,925,258 B2 * 8/2005 Lo ................................... 398/47
2004/0047324 A1 * 3/2004 Diener .......................... 370/338
(Continued)

FOREIGN PATENT DOCUMENTS

RU    2262802    10/2005
RU    2292119    1/2007
(Continued)

OTHER PUBLICATIONS

Kazuo Yamamoto, Toshikiyo Hirata, Eiju Isozaki, Moriyuki Mizumachi, "Spectrum Measurement in an Aircraft Cabin in Flight", IEEE, vol. 1, May 11, 2003, pp. 367-370.
(Continued)

*Primary Examiner* — Jae Y Lee
*Assistant Examiner* — Alan Lindenbaum
(74) *Attorney, Agent, or Firm* — Greer, Burns & Crain, Ltd.

(57) ABSTRACT

The present invention provides a method and an apparatus for detecting a communication channel in whose frequency band radio signals are transmitted by different radio signal sources inside a cabin. In this case a wide band antenna receives the radio signals transmitted inside the cabin. Different demodulators are provided, each of which demodulate the radio signals received by the wide band antenna within an associated frequency range of the demodulator. A configuration logic establishes whether, in a frequency band within a demodulated frequency range, radio signals are being transmitted simultaneously by different radio signal sources. In the case of impermissible signal transmissions of a radio signal source, e.g. when a non-safety-relevant system transmits signals in the same frequency band of a safety-relevant system in the same frequency bands of a safety-relevant system, the non-safety-relevant system is reconfigured by the configuration logic and an alarm or warning signal is generated as an indication of the impermissible condition.

16 Claims, 4 Drawing Sheets

(56) References Cited

U.S. PATENT DOCUMENTS

2004/0098745 A1    5/2004  Marston et al.
2006/0107295 A1*   5/2006  Margis et al. ................... 725/81

FOREIGN PATENT DOCUMENTS

WO    WO 2006/052941    5/2006
WO       2006094036     9/2006

OTHER PUBLICATIONS

Press release, "Airbus Demonstrates First Multipurpose Wireless Cabin Network at WAEA in Hamburg", Sep. 15, 2005.

Canadian Office Action, Feb. 10, 2015.

Decision on Granting, Nov. 13, 2012.

* cited by examiner

APPARATUS AND A METHOD FOR DETECTING A COMMUNICATION CHANNEL

TECHNICAL BACKGROUND

This invention relates to an apparatus and a method for detecting a communication channel in whose frequency band radio signals from different radio signals inside a cabin, in particular inside an aircraft cabin of an aircraft, are simultaneously transmitted.

Aircrafts are provided with a speak intercom or on-board communication system by means of which members of the aircraft crew are able to inform passengers or can issue instructions regarding the behaviour of passengers.

Airlines are also increasingly offering passengers the possibility of communicating via W-LAN (Wireless Local Area Network) or other wireless transmission technologies, for example. A passenger can use his mobile terminal device, e.g. a laptop, to exchange data with a local network of the aircraft via a wireless interface. In this case the data are transmitted in a communication channel whose frequency band lies in a frequency range which is determined by the relevant transmission technology. The wireless communication systems transmit data in licensed and unlicensed frequency bands. A licensed frequency band allows excessive access to a predetermined range of the frequency spectrum, wire ranges of the licensed spectrum being allocated to specific transmission technologies, e.g. GSM or UMTS.

Unlicensed frequency bands are available to all users for signal transmission, but the permissible transmission signal power is limited. The so-called ISM bands (Industrial, Scientific and Medical Band) represent an example of license-free frequency bands for license-free audio and video transmission or for data transmission in W-LAN or Bluetooth. Another example of an unlicensed frequency band is represented by the U-NII frequency band (Unlicensed National Information Infrastructure Band) at approx. 5 GHz.

In conventional transmission systems for wireless data transmission with mobile terminal devices of air passengers, it may transpire that because of a non-optimised configuration, in terms of frequency band allocation, a plurality of users are able to transmit data simultaneously in communication channels which use the same frequency band $\Delta f$. Consequently the data transmission rate for the users concerned is reduced and this may result in increased bit error rates due to interference.

Another disadvantage of a conventional communication system for transmitting data inside an aircraft cabin of an aircraft lies in the fact that previously a separate on-board communication system had to be provided to guarantee, in any situation, that the crew members are able to give instructions to the passengers. In the conventional on-board communication system a crew member, for example the stewardess or the pilot, speaks into a microphone which is fixedly connected to the on-board communication system. The travelling passengers hear the instructions or information over speakers which are installed inside the aircraft cabin. One disadvantage of a conventional on-board communication system consists in the fact that a crew members, for example a stewardess, is only able to make an announcement to the passengers when she has reached the permanently wired terminal device of the on-board communication system and there speaks into a microphone of a receiver. However, reaching the on-board communication system is difficult for the crew member in certain flight situations.

An object of the invention is therefore to provide a device and method which allows wireless communication of crew members between each other and with the passengers without infringing the requirements regarding flight safety.

SUMMARY OF THE INVENTION

The invention provides an apparatus for detecting a communication channel in whose frequency band radio signals from different radio signal sources inside a cabin are transmitted, with a wide band antenna for receiving the radio signals received inside the cabin, a plurality of demodulators, each of which demodulate the radio signals received by the wide band antenna in an associated frequency range of the demodulator, and with a configuration logic for establishing whether, in a frequency band $\Delta f$ within a frequency range $\Delta F$, demodulated by the demodulators, radio signals are being transmitted from different radio signal sources that are possibly transmitting impermissibly in the frequency range $\Delta F$.

The detection apparatus according to the invention detects in a frequency band $\Delta f$ radio signals which are transmitted simultaneously by different radio signal sources. If one of the radio signal sources is a radio signal source of a crew member or of the wireless on-board radio system, the latter always has priority. The configuration logic allocates to the remaining radio signal sources other frequency bands $\Delta f$, preferably in the same frequency range $\Delta F$. This ensures that a crew member is not disturbed, during his/her information transmission, by another radio signal source inside the aircraft cabin, e.g. a transmitter of a mobile terminal device. If the apparatus device according to the invention detects that different radio signal sources are using one frequency band $\Delta f$ simultaneously, and that none of the radio signal sources belongs to the wireless on-board radio system, it may allocate to some of the radio signal sources other frequency bands $\Delta f'$ or reconfigure the allocated frequency bands, provided that free frequency bands are still available. This makes optimum use of the available bandwidth so that the data transmission rates of the different terminal devices inside the aircraft cabin can be maximised.

The detection apparatus enables any crew member to use his/her own mobile terminal device, a headset for example, to communicate wirelessly with other crew members without interfering with mobile terminal devices of the passengers. For instance, this enables a stewardess to communicate with other crew members even when distributing drinks in the aircraft cabin, for example with another stewardess who is in the on-board galley. This wireless on-board communication can also be provided in addition to existing permanently wired on-board communication system.

With the apparatus according to the present invention it is also possible to detect an impermissible radio signal which is being transmitted, for example, from a mobile terminal device of a passenger during a critical flight phase, particularly during a takeoff or landing phase. If the apparatus detects an impermissible radio signal which is being transmitted in a frequency band during a critical flight phase, a corresponding warning or alarm signal can be generated or the radio signal can be distorted. In this case the crew members, in addition to the normal cabin announcement, will again have the possibility of pointing out to the passengers that the terminal devices must be switched off during takeoff and landing of the aircraft.

Embodiments of the apparatus and method according to the present invention are described in the following with reference to the attached figures for explaining features of the invention.

DETAILED DESCRIPTION OF EMBODIMENTS

Figure 1:
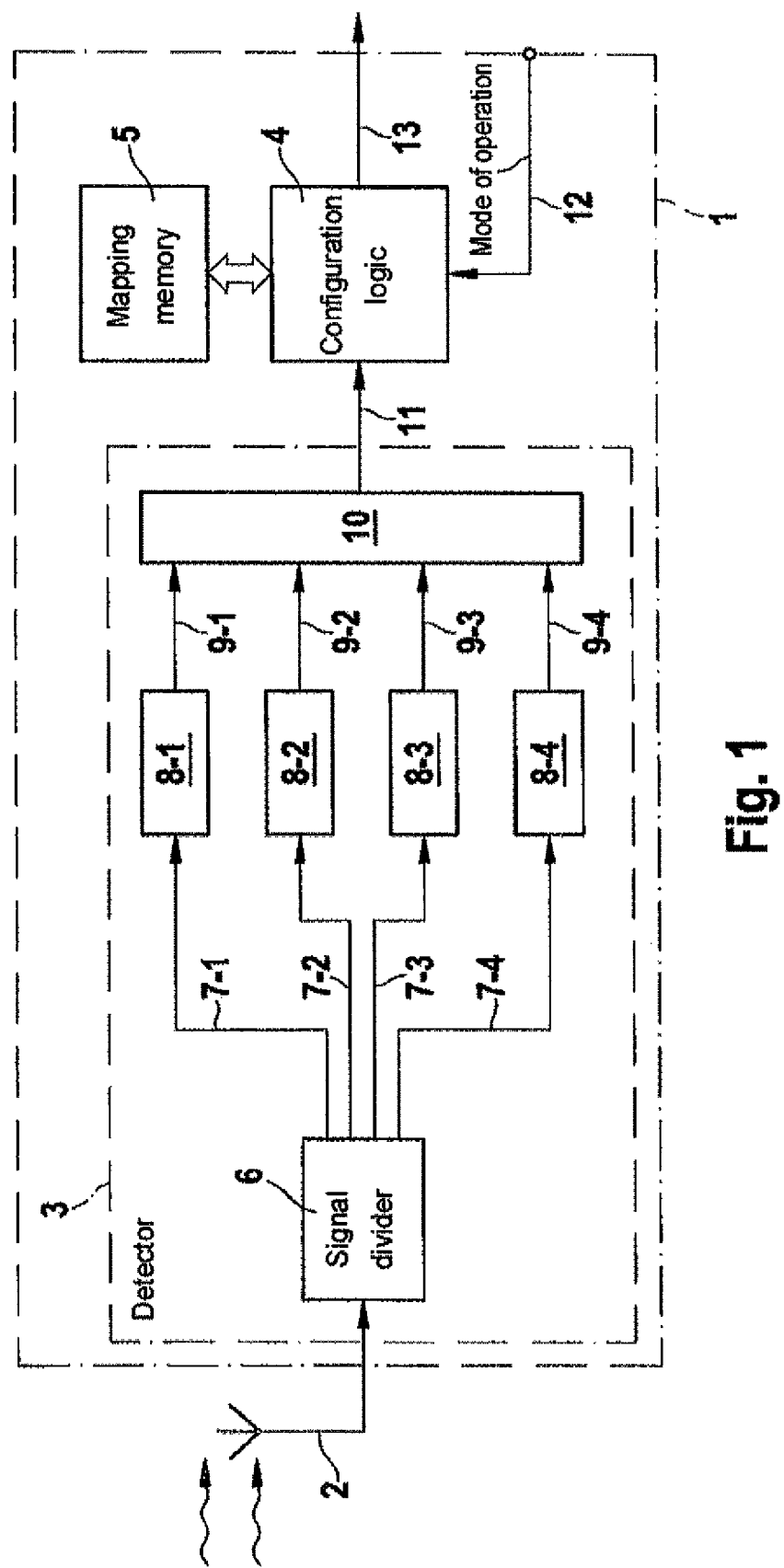
FIG. 1 shows a block diagram of a possible embodiment of detection apparatus according to the present invention.

As can be seen from FIG. 1, the detection apparatus 1 for detecting a communication channel in whose frequency band (Δ f) radio signals are transmitted from different radio signal sources inside a cabin has a wide band antenna 2, a detector 3 and a configuration logic 4 which, in the exemplary embodiment shown in FIG. 1, is connected to a memory 5. Wide band antenna 2 serves to receive the radio signals transmitted inside the aircraft cabin. Wide band antenna 2 is connected to a signal divider 6 which divides the signal received signal divider 6 may, for example, be a single signal node which distributes the signal received. Alternatively, signal divider 6 may also be formed by a demultiplexer which switches the received signal successively to different outputs.

Signal divider 6 is connected by cables 7-$i$ to different demodulators 8-$i$. In the exemplary embodiment shown in FIG. 1 detector 3 contains four different demodulators 8-1 to 8-4. Each demodulator 8-$i$ demodulates the radio signals received by wide band antenna 2 in an associated frequency range (ΔF).

In a possible exemplary embodiment demodulator 8-1 demodulates radio signals in a frequency range ΔF1 from 0.4 GHz to 2.2 GHz, i.e. in a frequency range which is used by most mobile telephone standards, e.g. by GSM networks.

The second demodulator 8-2 demodulates, for example, radio signals in a frequency range ΔF2 from 2.4 GHz to 21.7 GHz, i.e. in a frequency range which is used by newer generation w-LAN access networks and UMTS access networks.

The third demodulator 8-3 demodulates the radio signals in a possible exemplary embodiment in a frequency range ΔF3 from 6.1 GHz to 10.6 GHz, i.e. in a frequency range which is used, for example, by UWB (Ultra Wide Band) applications.

The fourth demodulator 8-4 of detector 3 detects, for example, radio signals in a frequency range ΔF4 from 5 GHz to 6 GHz, i.e. in a frequency range which is also used by W-LAN access networks (U-NII frequency band).

Figure 2:
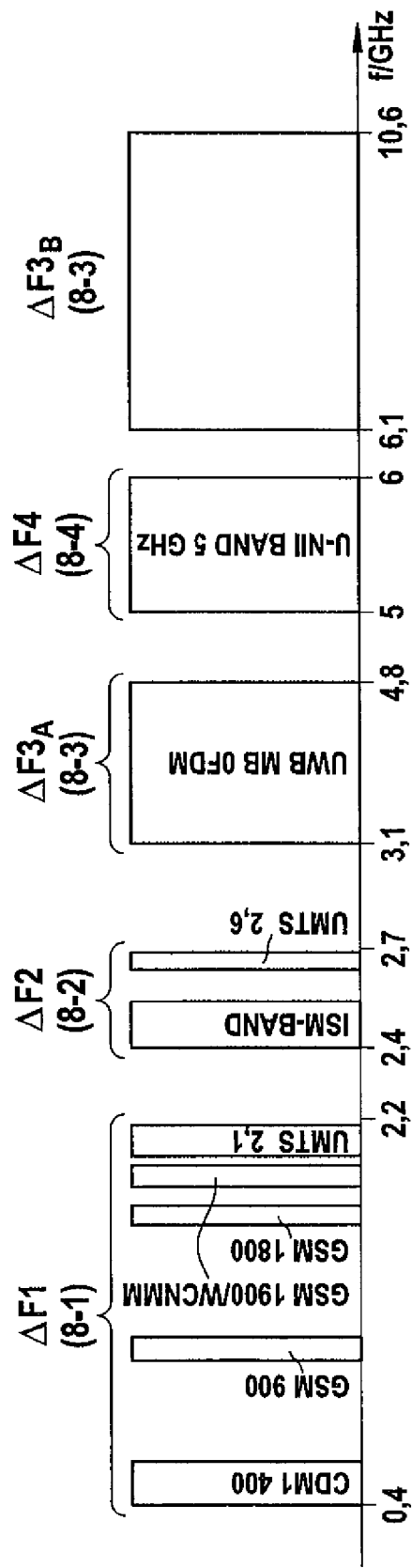
FIG. 2 shows a spectrum to explain the mode of operation of the detection apparatus according to the present invention.

FIG. 2 illustrates the frequency ranges ΔF which can be demodulated by the different demodulators 8-1, 8-2, 8-3, 8-4. Her the third demodulator 8-3 is able, in an exemplary embodiment, demodulate not only the frequency range ΔF3 between 3.1 and 4.8 GHz, but also a frequency range from 6.1 to 10.6 GHz.

Wide band antenna 2 shown in FIG. 1 is preferably able to receive signals within a wide frequency range of 09.4 GHz to 10.6 GHz.

Demodulators 8-$i$ each contain an analogue receiver for converting the receiving frequency to the base band. A digital data processing unit, for example a DSP, is connected in series to the analogue receiver. Demodulators 8 demodulate the received analogue signal and convert the information transmitted in the frequency band or via the carrier frequency to digital data which are made available to the digital signal processor DSP. The digital signal processor DSP and the data processing unit process the received data. For example, the data processing unit of demodulator 8 is formed by a base band modulation chip for the relevant transmission technology. Detector 3 is capable of detecting signals both from TDD systems, where an uplink connection and a downlink connection are separated from each other in the time range, as well as EDD systems in which the uplink connection and a downlink connection are separated from each in the frequency range.

Demodulators 8-1 to 8-4 shown in FIG. 1 are connected by output cables 9-1 to 9-4 to a network communication interface NCI 10. Interface 10 is connected on the output side by a cable 11 to configuration logic 4 of detection apparatus 1. Configuration logic 4 establishes whether, in a frequency band Δf within a frequency range ΔF, demodulated by demodulators 8-$i$, radio signals are being transmitted simultaneously from different radio signal sources. The transmitted radio signals have a radio signal identification, e.g. for identifying the transmitting radio signal source. By means of the radio signal identifications configuration logic 4 is able to distinguish the different radio signal sources from each other and to establish whether different radio signal sources are simultaneously transmitting different radio signal sources in the same frequency band Δf: Apparatus 1 shown in FIG. 1 is particularly suitable for implementing a wireless on-board radio system inside an aircraft.

In a possible embodiment the crew members communicate via a wireless on-board radio system on specific frequency bands configured for this purpose in memory 5. As soon as configuration logic 4 establishes that radio signals are being transmitted from other radio sources in a frequency band Δf reserved for the crew members, a warning is issued, for example by means of an optical warning signal. In addition, configuration logic 4 allocates to the radio signal source which is impermissibly transmitting in the reserved frequency band Δf of the wireless on-board radio system a different frequency band Δf, preferably in the same frequency range ΔF of the corresponding demodulator 8. This ensures that the frequency bands Δf reserved for the crew members are kept free at all times.

If configuration logic 4 detects that two radio signal sources, for example two different mobile terminal devices of different users, are simultaneously transmitting radio signals in a frequency band Δf, and free frequency bands Δf are still available, configuration logic 4 allocates to one or more of the uses a free frequency band, according to the transmission technology. As a result of this the data transmission rates of the different on-board radio systems or mobile terminal devices can be increased.

In a possible embodiment the detection apparatus 1 can be operated in different modes of operation. For example, configuration logic 4 receives via a control cable 12 a control signal for setting different modes of operation. In a possible embodiment a normal operating mode ODM (Operational Detection Mode) and a special operating mode DDM (Dedicated Detection Mode) can be provided.

The operational detection mode ODM is in this case activated in non-critical flight phases, i.e. when the aircraft has reached its cruising altitude.

The dedicated detection mode DDM is activated in critical flight phases, i.e. during the takeoff process and when landing. In the dedicated detection mode DDM radio signal sources are detected which must not be switched on in these critical flight phases.

In operational detection mode ODM all four demodulators 8 shown in FIG. 1 are activated. In the operational detection mode, i.e. when the aircraft has reached its cruising altitude, configuration logic 4 ensures that a plurality of radio signal sources does not transmit radio signals simultaneously in the same frequency band $\Delta f$, so that the signal spectrum is used to the optimum degree and the data transmission rates are increased. Moreover, logic 4 ensures that reserved frequency bands are kept free for transmission between the crew members and for crew announcements.

Figure 3:
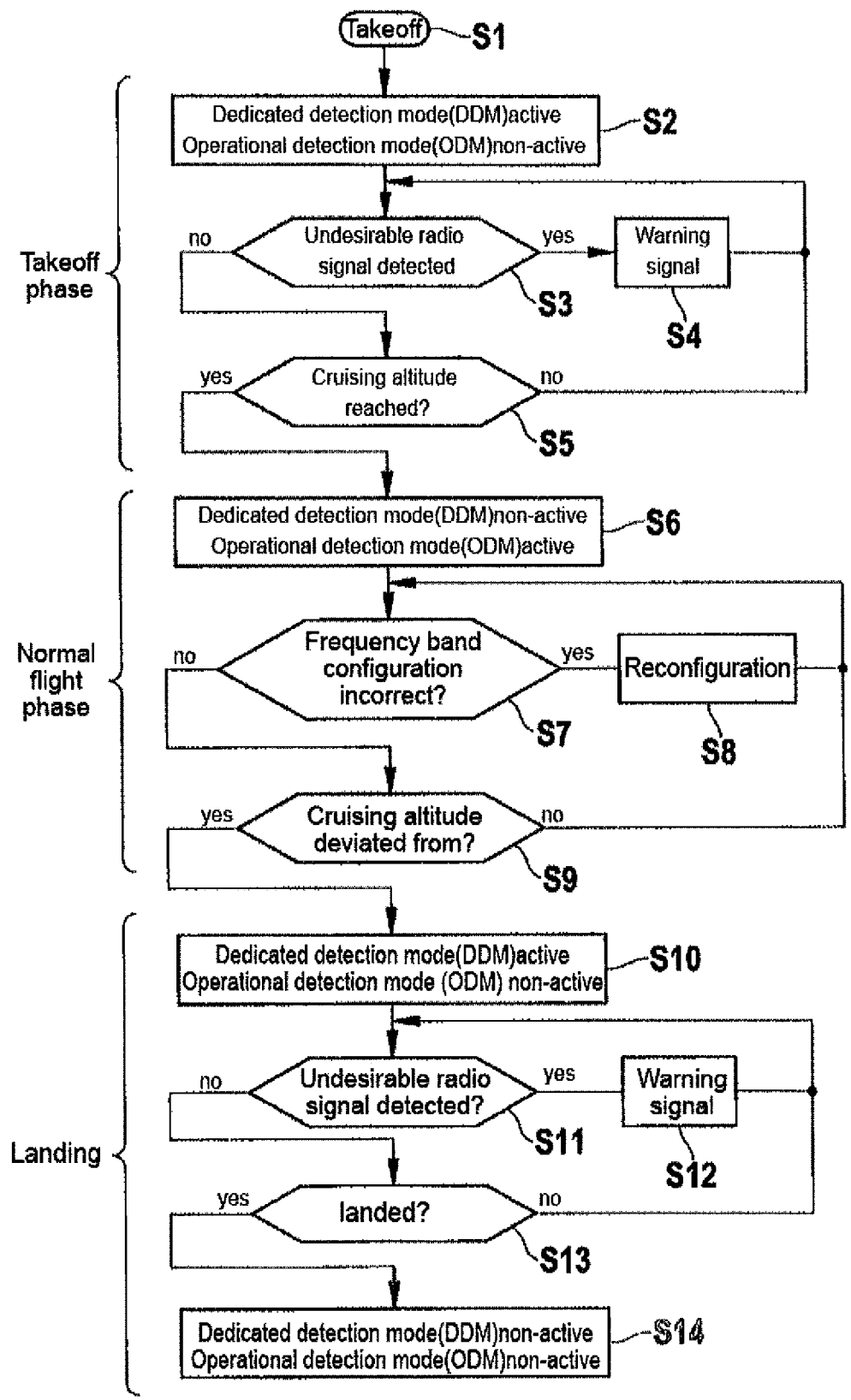
FIG. 3 shows a flow diagram to explain the mode of operation of the detection apparatus according to the present invention.

In the dedicated detection mode DDM configuration logic 4 monitors in particular the demodulated signals of demodulators 8-1 and 8-2, which demodulate radio signals within the frequency range from 09.4 GHz to 2.2 GHz and from 2.4 GHz to 2.7 GHz. The signal transmission from mobile radiotelephones (GSM-900, GSM-1800 and GSM-1900/WCDMA and UMTS 2.1) normally take place in these frequency ranges $\Delta F_1, \Delta_2,$ FIG. 3 shows a flow diagram of a possible exemplary embodiment for implementing the different modes of operation, in the case of the inventive detection device 1.

After detection apparatus 1 is switched on in step S1, a dedicated detection mode DDM is then activated in step 2 and the operational detection mode ODM is deactivated. During the takeoff phase of the aircraft inventive detection device 1 therefore operates in the dedicated detection mode DDM. In a further step S3 detection apparatus 1 detects whether an undesirable radio signal is present, i.e. whether, in a frequency band $\Delta f$ of the frequency, ranges $\Delta F$ demodulated by demodulators 8, particularly in a reserved frequency band $\Delta f$ of a communication channel of the wireless on-board radio system, a radio signal is being transmitted by a radio signal source present inside the aircraft cabin. If this is the case, configuration logic 4 emits a warning signal in step S4, for example in the form of a signal light.

If no undesirable radio signal is present, detection device 12 checks in step S5 whether the aircraft has already reached its cruising altitude. In one possible embodiment this can be communicated to detection apparatus 1 by a crew member by actuating a switch. In an alternative embodiment detection apparatus 1 automatically detect whether the predetermined cruising altitude has been reached. If the cruising altitude has been reached, and the takeoff phase of the aircraft has therefore been completed, configuration logic 4 is switched in step S6 to the operational detection mode ODM and the dedicated detection is deactivated.

In operational detection mode ODM configuration logic 4 establishes whether, in a reserved frequency band $\Delta f$ of a communication channel of an internal wireless on-board radio system, a radio signal from another radio signal source is being transmitted. If another radio signal source transmits a radio signal on a reserved frequency band which is provided for the wireless on-board radio system, it is established that the frequency band configuration is incorrect. Configuration logic 4 then allocates to the other radio signal step in step S8, by means of the frequency band layout stored in mapping memory 5, a different free frequency band $\Delta f'$ within the demodulated frequency range $\Delta F$. The frequency bands reserved for the internal on-board radio system are therefore kept free at all times. Moreover, configuration logic 4 can also ensure in operational detection mode ODM, that radio signal sources of the mobile terminal devices of the passengers transmit data on different frequency bands, if possible, so that the frequency spectrum provided is used to the optimum degree. For example, if configuration logic 4 detects that two radio signal sources of passengers are transmitting radio signals in the same frequency band $\Delta f$, a different frequency band $\Delta f'$ is allocated to one of the two mobile terminal devices so that the data transmission rate of both mobile terminal devices is increased.

If detection apparatus 1 detects in step S9 that the cruising altitude has been deviated from, dedicated detection mode DDM is again activated in step S10 and operational detection mode ODM is deactivated. During the landing phase configuration logic 4 monitors, in step S11, whether an undesirable radio signal is present in any frequency band $\Delta f$ and, if necessary, transmits a warning signal in step S12. If detection apparatus 1 detects, in step S13, that the aircraft has landed, both dedicated detection mode DDM and operational detection mode ODM are deactivated in step S14.

Figure 4:
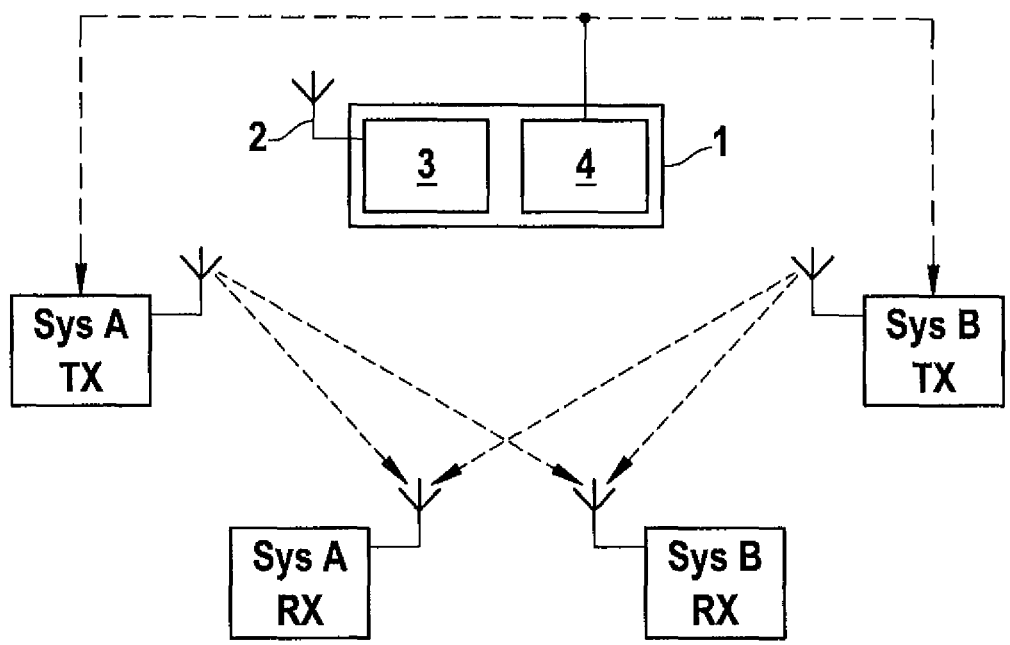
FIG. 4 shows a further diagram to explain the mode of operation of the detection apparatus according to the present invention.

FIG. 4 shows a further diagram to explain the mode of operation of the detection apparatus 1. As can be seen from FIG. 4, detection apparatus 1 monitors different transmission systems, e.g. a safety-relevant system A and non-safety-relevant system B. Safety-relevant system A may, for example, be a wireless on-board radio system for the crew members. Non-safety-relevant system B is formed by a W-LAN network, for example. If, for instance, detection device 1 detects that both safety-relevant system A and non-safety-relevant system B are transmitting a radio signal on the same frequency band $\Delta f$, detection device 12 informs the transmitter (Tx) of safety-relevant system A that it can continue to transmit in frequency band $\Delta f$. The transmitter (TX) of non-safety-relevant system B is then informed that it must change to another frequency band $\Delta f'$. In this case configuration logic 4 transmits a control signal to transmission devices TX of the different systems A, B. In this control signal the new frequency band $\Delta f'$ is communicated preferably to transmitter TX of system B. Configuration logic 4 reads out a frequency band layout plan stored in mapping memory 5, and allocates to transmitter TX of non-safety-relevant system B a free frequency band $\Delta f'$. A reconfiguration or reallocation of frequency bands $\Delta f$ therefore takes place with inventive detection device 12 when a non-safety-relevant radio signal source is using a frequency band of a safety-relevant system or two transmitters or radio signal sources are transmitting on the same frequency band $\Delta f$. Whilst the safety aspect is given priority in one reconfiguration process, an increase in the data transmission rates and minimisation of transmission errors are important in the other reconfiguration process.

In the case of inventive detection device 1 the allocation of a frequency band $\Delta f$ preferably takes place in the same frequency range $\Delta F$ of the respective demodulator.

The frequency bands reserved for the internal wireless on-board radio system may lie in the same or in different frequency ranges $\Delta F$. The number and frequency position of the reserved frequency bands $\Delta f$ is preferably freely configurable.

The frequency bandwidth of frequency ranges $\Delta f$ and frequency bands $\Delta f$ may vary in different embodiments.

LIST OF REFERENCE SYMBOLS

1 Detection apparatus
2 Wide band antenna
3 Detector
4 Configuration logic
5 Memory
6 Signal divider
7 Cables
8 Demodulator
9 Output cables
10 Interface
11 Cable
$\Delta f$ Frequency band
$\Delta F$ Frequency range

The invention claimed is:

1. An apparatus for detection of a communication channel having a frequency band in which radio signals are transmitted from different radio signal sources inside a cabin of an aircraft, said apparatus comprising:
   a wide band antenna to receive the radio signals transmitted inside the cabin;
   a plurality of demodulators, each of which demodulate the radio signals received by said wide band antenna in an associated frequency range of the respective demodulator; and
   a configuration logic for establishing whether, in a frequency band within a frequency range demodulated by said demodulators, radio signals are being simultaneously transmitted by different radio signal sources,
   wherein said configuration logic establishes, in an operational detection mode during a normal flight phase of the aircraft, said normal flight phase being distinct from a take-off phase and a landing phase of the aircraft, whether, in a first frequency band reserved exclusively for crew members and a second frequency band allocated exclusively for passengers of the aircraft of the communication channel of an internal on-board radio system, a radio signal from another radio signal source is being transmitted, and allocates to the other radio signal source a different frequency band within the demodulated frequency range, such that said first reserved frequency band of the crew members and said second allocated frequency band of the passengers are kept free from interference during said operational detection mode.

2. The apparatus according to claim 1, wherein a signal divider is provided which applies the radio signals received by the wide band antenna to the demodulators.

3. The apparatus according to claim 2, wherein the wide band antenna receives radio signals in a frequency range from 0.4 GHz to 10.6 GHz.

4. The apparatus according to claim 2, wherein the signal divider is a demultiplexer.

5. The apparatus according to claim 1, wherein the configuration logic establishes, in a dedicated detection mode, whether a radio signal, in a frequency band of a frequency range demodulated by the demodulators or in a frequency band reserved for the crew members or passengers of the aircraft of a communication channel of an internal on-board radio system, is being transmitted by a radio signal source present inside the cabin.

6. The apparatus according to claim 5, wherein, in the dedicated detection mode, the configuration logic reports the radio signal transmission by a radio signal source present inside the cabin.

7. The apparatus according to claim 1, wherein a first demodulator demodulates radio signals in a frequency range from 0.4 GHz to 2.2 GHz,
   wherein a second demodulator demodulates radio signals in a frequency range from 2.4 GHz to 2.7 GHz,
   wherein a third demodulator demodulates radio signals in a frequency range from 3.1 GHz to 4.8 GHz and 6.1 GHz to 10.6 GHz, and
   wherein a fourth demodulator demodulates radio signals in a frequency range from 5 GHz to 6 GHz.

8. The apparatus according to claim 1, wherein the demodulators are connected by a common network interface to the configuration logic.

9. The apparatus according to claim 1, wherein the radio signal sources are mobile terminal devices.

10. The apparatus according to claim 1, wherein the radio signal sources have radio signal identifications.

11. A method for detecting a communication channel in which radio signals are transmitted by different radio signal sources, comprising the steps:
    demodulating all radio signals detected inside a cabin of an aircraft,
    establishing whether, in a frequency band of the demodulated frequency range, radio signals of different radio signal sources are being simultaneously transmitted,
    establishing, in an operational detection mode during a normal flight phase of the aircraft, said normal flight phase being distinct from a take-off phase and a landing phase of the aircraft, whether, in a first frequency band reserved exclusively for crew members and a second frequency band allocated exclusively for passengers of the aircraft of the communication channel of an internal on-board radio system, a radio signal of another radio signal source is transmitted and
    allocating a different frequency band of the demodulated frequency range to the other radio signal source, such that said first reserved frequency band of the crew members and said second allocated frequency band of the passengers are kept free from interference during said operational detection mode.

12. The method according to claim 11, further comprising, in a dedicated detection mode, detecting whether a radio signal, in a frequency band of a demodulated frequency range of a communication channel of an internal on-board radio system, is transmitted by a radio signal source present inside the cabin.

13. The method according to claim 12, wherein, in the dedicated detection mode, a radio signal source present in the cabin is reported.

14. The method according to claim 12, further comprising manually or automatically switching between the operational detection mode and the dedicated detection mode.

15. The method according to claim 11, wherein the radio signal sources have signal identifications.

16. The method according to claim 11, wherein radio signals are detected inside the aircraft cabin by a wide band antenna in a frequency range from 09.4 GHz to 10.6 GHz.

* * * * *